March 12, 1940.　　　R. L. ASHLEY　　　2,193,615
TOOL CHUCK
Filed April 6, 1938　　　2 Sheets-Sheet 1
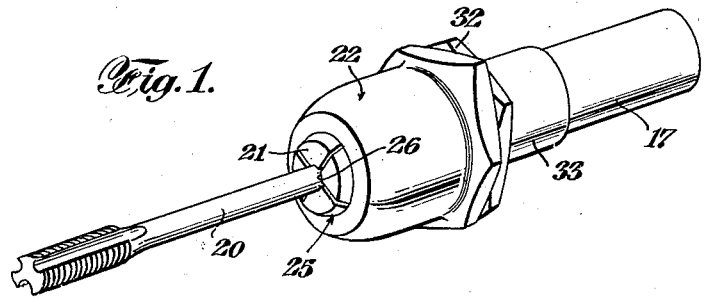
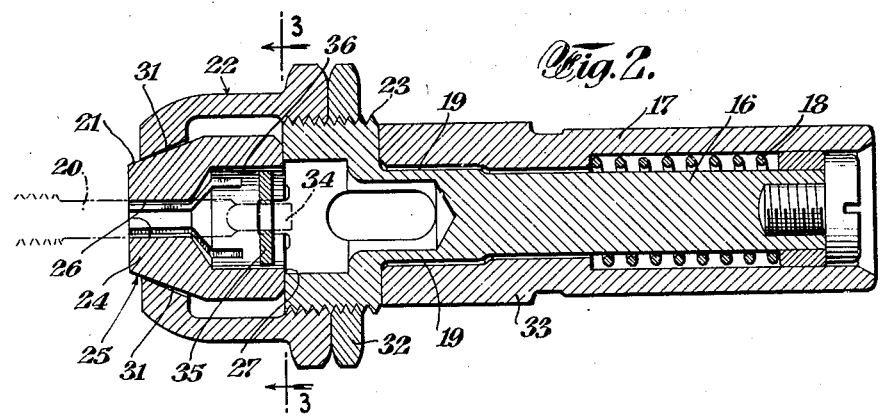
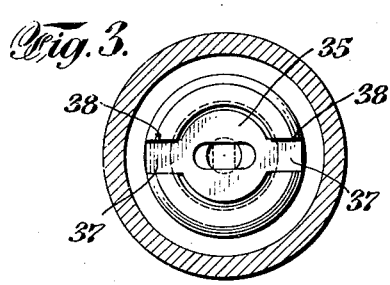
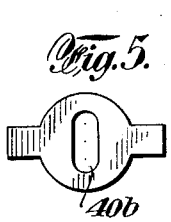
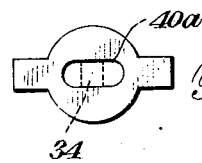
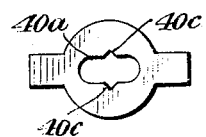
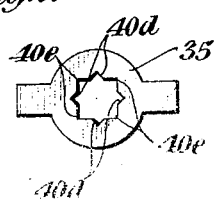
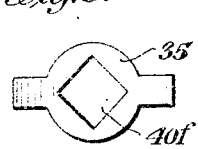
INVENTOR
Robert L. Ashley
BY
Edwards, Bower & Pool
ATTORNEYS

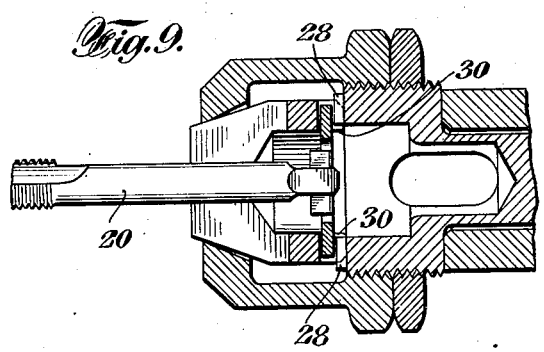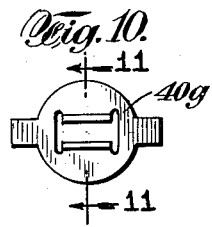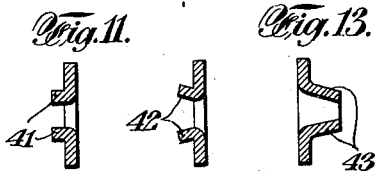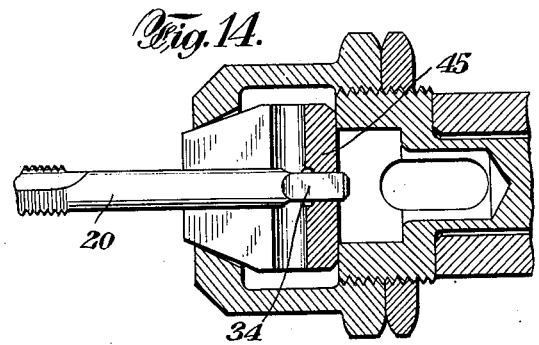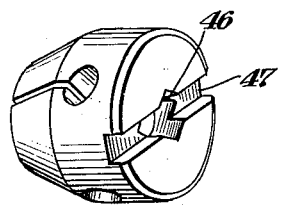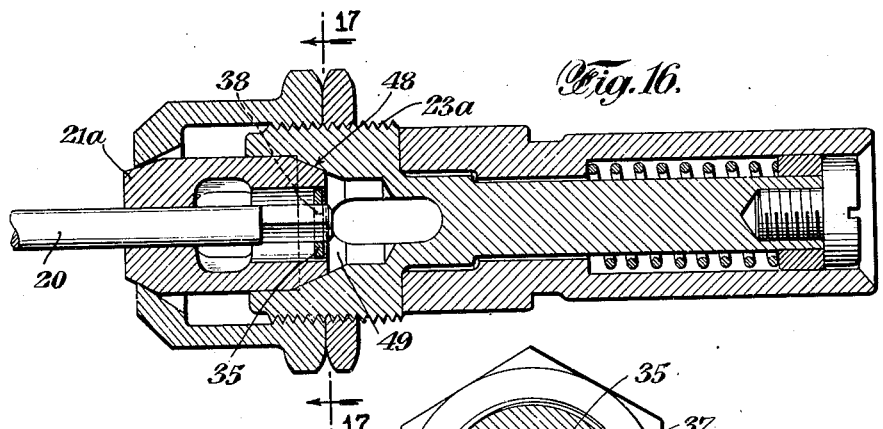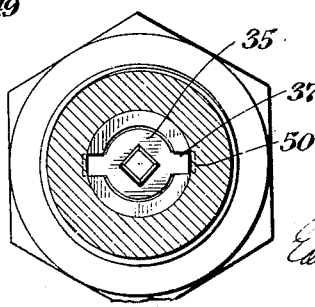

Patented Mar. 12, 1940

2,193,615

UNITED STATES PATENT OFFICE 2,193,615

TOOL CHUCK

Robert L. Ashley, Greenfield, Mass., assignor to Greenfield Tap and Die Corporation, Greenfield, Mass., a corporation of Massachusetts Application April 6, 1938, Serial No. 200,406

1 Claim. (Cl. 279—49)

This invention relates to improvements in chucks for holding threading taps and similar tools having shaped ends adapted to fit into a socket to prevent the tool from turning in the chuck.

An object of the invention is to provide a chuck of this type employing a jaw unit of the tapered or acorn type and to associate therewith a socket for the tool shank tip. A more specific purpose is to provide a removable and interchangeable socket to adapt the jaw unit to different sizes and shapes of shank tips.

A purpose of the invention is to provide a construction of this type that is strong, simple, positive in action and readily constructed from suitable types of metal. Other objects and advantages of the invention, including the construction, arrangement and combination of parts will appear from the following description considered in connection with the accompanying drawings in which, Fig. 1 is a perspective view of the chuck gripping a tap;

Fig. 2 is a longitudinal central section through the chuck;

Fig. 3 is a cross section on line 3—3 of Fig. 2, showing a separable shank socket in place;

Figs. 4, 5, 6, 7 and 8 are face views of shank sockets having socket openings of various contours;

Fig. 9 is a fragmentary view similar to Fig. 2 but at right angles thereto, showing another form of shank tip socket in place;

Fig. 10 is a face view of the form of shank tip socket shown in Fig. 9;

Fig. 11 is a section on line 11—11 of Fig. 10;

Figs. 12 and 13 are similar sections through modified forms of shank tip socket;

Fig. 14 is a sectional view similar to Fig. 9 showing a shank tip socket integral with the jaw unit;

Fig. 15 is a perspective view of the jaw unit and socket;

Fig. 16 is a longitudinal section similar to Fig. 2 showing a modified form; and Fig. 17 is a section on line 17—17 of Fig. 16 and illustrating a modification.

In the form illustrated in Figs. 1-8 the chuck consists generally of a jaw unit 21 having a tapered surface engaged by cap 22 threaded on body 23 to hold the jaw unit 21 firmly on the body 23 and to compress the jaws of said unit into engagement with the shank of a tap 20 or the like. Arrangements of this type have heretofore been employed for threading dies, one form being illustrated in patent to Koehler, No. 1,945,906. An advantage of this arrangement is the ease with which dies or chucks can be interchanged and can be compressed against the tool or work. The body 23 may have a shank 16, sleeve 17 and intervening spring 18, with flat drive faces 19 on the shank and sleeve, providing a floating or self-adjusting body structure.

In the embodiment illustrated the jaw unit 21 is formed of a single piece of metal having a plurality of jaws 24 provided with tapered outer faces 25 and tool-gripping inner faces 26. The inner end 27 of the unit is seated on the end of the body 23 and suitably maintained against rotation thereon, as by providing lugs 28 (Fig. 9) fitting suitable recesses 30 in the jaw unit 21. The cap 22 threaded on the body 23 is provided with a conical face 31 engaging the conical faces 25 of the jaws 24, arranged to center the unit 21 and hold it firmly in place on body 23, as well as to force the jaws 24 inwardly, when the cap 22 is screwed down on body 23. A lock nut 32 threaded on body 23 may be provided to hold cap 22 in adjusted position. Body 23 is provided with a suitable shank 33 of any desired type.

In order to prevent the tap from rotating in the jaw unit 21, a suitable socket carried by the jaw unit is provided. Such socket may be separable, permitting the use of the chuck with taps of similar shank size having shaped tips varying in size or contour. A convenient arrangement illustrated in Figs. 2 and 3 employs a socket or driver plate 35 fitting into a central recess 36 in the jaw unit 21 and provided with tongues 37 fitting into registering slots 38 in the base of jaw unit 21. Slots 38 may be continuations of recesses 30 already described.

The driver plate 35 is provided with a suitable opening adapted to receive the shaped tip 34 of a tap 20 or other instrument, such tips generally being square in cross section. The socket may be in the form of an elongated recess 40a having a width equal to the width of the tap shank tip 34 between opposite flat faces, as shown in Fig. 4. A similar slot 40b may be provided at right angles to the axis of opposite tongues 37, the plate 35 fitting in the jaw unit 21 with sufficient looseness to permit the tongues 37 to slide lengthwise in slots 38, this arrangement permitting a snug fit between slot 40b and shank tip 40a while allowing the driver plate 35 to register itself with the axis of the gripping faces 26 of jaws 24.

The slot 40a may be provided with opposed right angled recesses 40c as shown in Fig. 6, arranged to engage opposite angles of a shank tip

34 of different size from that accommodated by slot 40a, this type of driver plate being adapted to accommodate two different sizes of tips. The driver plate 35 shown in Fig. 7 has right-angled recesses 40d arranged to engage the angles of a shank tip 34 of one diameter, and intervening similar recesses 40e arranged to engage the angles of a shank tip of another diameter. The driver plate 35 of Fig. 8 is provided with a single rectangular recess 40f adapted to fit a square shank 34.

The driver plate 35 may be provided with means for engaging the shank tip 34 extending beyond the plate, as by striking up the portion of the metal on opposite sides of a central slot 40g. In the form shown in Figs. 9, 10 and 11 the metal is struck up in the form of lugs 41 having inner faces extending along the shank tip 34 when in operative position. Such lugs may be slightly flared outwardly as at 42 in Fig. 12 to facilitate the insertion of shank tip 34. They may likewise be positioned at the opposite side of driver plate 35, as shown at 43 in Fig. 13, and may be inclined inwardly, this arrangement serving both to facilitate insertion of the shank tip 34 and to engage shank tips of varying widths within the range between the shortest and the longest distance between the lugs 43.

The shank tip 34 may also be engaged in a socket constructed integral with the jaw unit 21. In the form shown in Figs. 14 and 15 an arrangement of this type is provided by employing a wall 45 extending across the inner end of the unit and integral therewith, wall 45 being provided with a central socket recess 46 arranged to fit the shank tip 34 of a tap 20 or the like engaged by jaws 24. A transverse slot 47 for engaging the positioning lugs 28 on body 23 may be formed in the lower face of wall 45.

The invention is also applicable to other constructions of jaw unit, cap and body, such as that shown in Figs. 16 and 17, in which the inner end of the jaw unit 21a is tapered at 48 to fit within a tapered recess 49 in the body 23a. The various modifications illustrated may be applied to this construction as by mounting the driver plate 35 with tongues 37 extending into suitable recesses 38 in the jaw unit 21a. The tongues 37 may likewise extend beyond said unit and into suitable recesses 50 in the tapered face 48 of body 23a (Fig. 17).

In use, a jaw unit 21 is selected for the shank size of the tool to be held by the chuck, and a driver plate 35 fitting the tip of the tool is inserted. The jaw unit 21 is sufficiently flexible to permit the insertion of the tool shank between jaws 24 when the cap 22 is backed off appropriately, and to be forced inwardly into gripping engagement with the shank when the cap 22 is screwed down on body 23.

While the preferred embodiment of the invention has been shown with a number of variations, it will be apparent that additional variations and changes may be made in the parts within the scope of the invention as set forth in the claim.

I claim:

A tool chuck comprising a body having a seating face and a positioning lug projecting from the face, a jaw unit including a base seated on said face and provided with a recess receiving the lug, a socket member removably mounted in the base and extending into said recess, and means for holding the jaw unit on the body.

ROBERT L. ASHLEY.